Aug. 21, 1962    D. F. SULLIVAN    3,050,575
THERMOCOUPLE
Filed Dec. 14, 1960
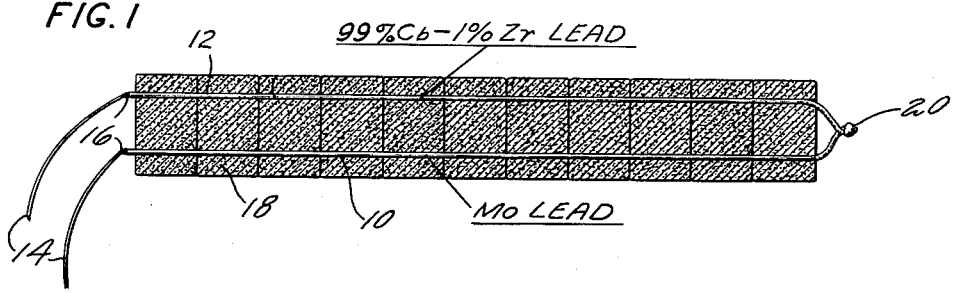
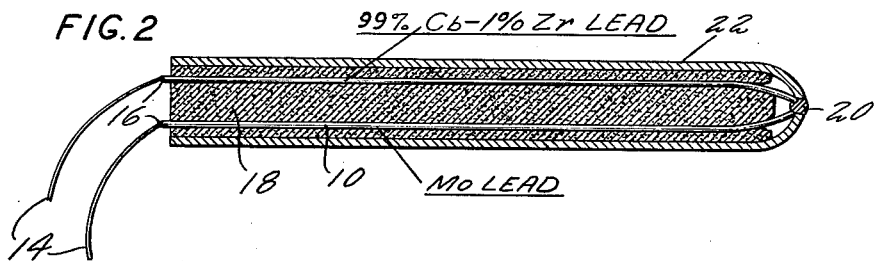
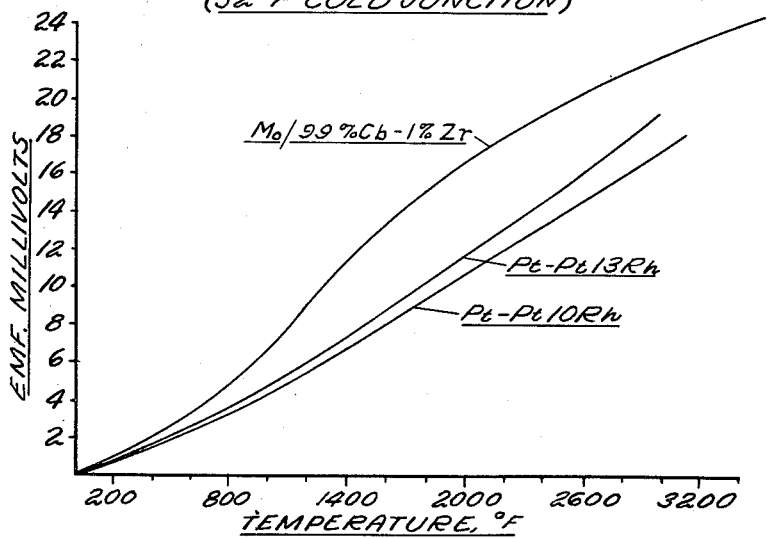
INVENTOR
DONALD F. SULLIVAN
BY M. B. Tasker
ATTORNEY

United States Patent Office 3,050,575
Patented Aug. 21, 1962

3,050,575
THERMOCOUPLE
Donald F. Sullivan, West Hartford, Conn., assignor to United Aircraft Corporation, East Hartford, Conn., a corporation of Delaware
Filed Dec. 14, 1960, Ser. No. 75,876
6 Claims. (Cl. 136—5)

My invention relates to improved thermoelectric elements which when joined to produce a thermoelectric couple are capable of producing a voltage which is a measure of temperatures up to 3400° F. and which are capable of withstanding a temperature of 4000° F. The provision of such a thermoelectric couple is a principal object of my invention.

Another object of my invention is the provision of a thermocouple which, when used in a vacuum or in an inert atmosphere, is capable of operation in the presence of reactor gamma and neutron flux.

In any reactor using lithium as a coolant, it may be desirable to use columbium containment pipes and vessels. No known thermocouple was practical with the columbium systems in use in such an installation. Chromel/Alumel enters into chemical reaction with columbium and melts at too low a temperature. Platinum/platinum-rhodium are unsatisfactory in a vacuum. Also, they enter into reactions with trace amounts of silicon present in most applications. Other standard refractory combinations were too brittle. My thermocouple has none of the above disadvantages and can be used to measure directly the temperature of columbium at elevated temperatures. It has been used on engineering test stands and satisfactorily measures the temperature of columbium piping in such a reactor installation.

It is, therefore, a further object of my invention to provide a thermocouple suitable for use in a lithium-cooled reactor installation.

Thermocouples of Chromel/Alumel suitable for reactor environment have been used, but these are adequate only below 2000° F. Platinum-alloy couples have been found unsatisfactory with respect to nuclear radiation and vacuum operation, while rhenium combinations have proved unsatisfactory with respect to strength and fabricability.

I have discovered that the metal molybdenum, which is a refractory metal having a very high-melting point, may be employed advantageously as a thermoelectric element electropositive to a 99% columbium–1% zirconium element. Columbium and zirconium are also refractory metals capable of withstanding very high temperatures when maintained in a vacuum or an inert atmosphere. These thermoelectric elements make it possible to construct a thermocouple of improved efficiency which may be subjected at its junction to intense heat without danger of injury. Further, it can be used in the presence of reactor gamma and neutron flux.

The melting points of the two wires are close enough to permit good welding at the junction. I have found that the addition of 0.5 percent by weight of titanium to the molybdenum is of benefit in welding. The strength of the weld bead has proved adequate and far stronger than the molybdenum/rhenium welds achieved prior to my invention. Columbium and zirconium have nearly the same electromotive force, so that variations in the zirconium percent for other purposes do not change the calibration appreciably. The use of the standard copper/copper-nickel extension lead is quite satisfactory. This is a very important consideration since, with all other thermocouples using high-temperature metals, as far as I am aware, standard leads cannot be used and the thermoelectric wires have to be carried back to a cold junction.

Since standard copper/copper-nickel leads can be used, it follows that the cold-junction compensator in a recording and indicating device can be the same standard device commonly used with platinum/platinum-rhodium thermocouples.

In order to increase the life of the molybdenum 99% columbium–1% zirconium thermocouple, it is beneficial to clad the thermocouple with a ceramic insulation when the couple is used for reactors and other test applications. Alumina has been found satisfactory for temperatures to about 3000° F. and beryllia at higher temperatures.

Some thermocouples cannot be clad because they are either too brittle or too soft to withstand the swaging process used to apply the cladding. My thermocouple can be clad with a metal-protecting tube. I prefer to use a columbium tube applied by the usual technique. A columbium cladding requires a vacuum or an inert atmosphere. The clad thermocouple can be used in any atmosphere which is compatible with the clad.

In the accompanying drawing,

FIG. 1 shows a thermocouple, in accordance with my invention, adapted for use in a vacuum or in an inert atmosphere;

FIG. 2 shows the same thermocouple with a columbium cladding; and

FIG. 3 shows the thermoelectric-output characteristics of a molybdenum/99% columbium–1% zirconium thermocouple over a range of 3400° F., as compared with well-known thermocouples of platinum/platinum–13% rhodium and platinum/platinum–10% rhodium.

Referring first to FIG. 1 of the drawing, the thermoelectric couple shown consists of a positive element in the form of a wire 10 of molybdenum and a negative element in the form of a wire 12, which comprises an alloy of columbium and zironium in the weight proportion of columbium 99%, zirconium 1%. Standard copper/copper-nickel leads 14 are provided which are welded to the thermoelectric elements at 16.

A plurality of ceramic beads 18, each having two axial passages, are threaded over the thermocouple wires 10, 12, and the usual welded junction between the ends of the wires is made at 20. To improve the welding characteristics, a small amount of titanium may be added to the molybdenum wire, preferably about in the weight proportion of 99.5% molybdenum–0.5% titanium. A thermocouple, as illustrated in FIG. 1, is suitable, if used in a vacuum or in an inert atmosphere, for the measurement of temperatures up to about 3400° F. and will safely withstand temperatures of 4000° F.

In FIG. 2, the thermocouple of FIG. 1 has been enclosed in a columbium cladding to give it a longer life. The cladding is effected by enclosing the thermoelectric elements of FIG. 1, together with the insulating ceramic beads thereon, in a columbium tube 22 and compressing the tube and its contents in a die to a somewhat smaller tube diameter. During this compression, the ceramic beads are crushed and compacted into a solid mass surrounding the wires. The welded joint 20 is then made between the ends of the wires. As shown, the cladding 22 is sealed at the joint end by squeezing the tube 22 and welding it to the joint. This is the usual technique in making clad thermocouples.

A thermocouple, as illustrated in either FIGS. 1 or 2, having my improved thermoelectric elements of molybdenum/99% columbium–1% zirconium, will have the output characteristics shown in FIG. 3, which compare very favorably with previously known thermocouples of platinum-rhodium composition which are wholly unsuitable for use in a lithium-cooled reactor environment.

The platinum/rhodium thermocouples, which have been extensively used in industry, have several disadvantages for the proposed use that my molybdenum/99% columbium–1% zirconium thermocouple overcomes. First, rhodium has a high cross section for neutrons which would result, at reactor conditions, in an appreciable transmutation to palladium, with serious calibration shifts. Second, platinum is very susceptible to contamination. For example, failure results from the formation of an apparent eutectic of platinum and silicon, the latter being present in most insulating materials. Finally, platinum evaporates quickly in vacuum at high temperatures.

My molybdenum/99% columbium–1% zirconium thermocouple eliminates all the above difficulties and, if used in a vacuum or in an inert atmosphere, has very satisfactory output characteristics, as shown in FIG. 3. Also, it is satisfactory with respect to nuclear radiation and vacuum operation and presents no difficulties with respect to strength and fabricability. Ceramic-insulated clad couples made of my improved thermoelectric elements and utilizing a ceramic insulation such as alumina or beryllia, as determined by temperature requirements, provide an easily fabricated couple which is capable of reactor use and use in vacuum at temperatures in the vicinity of 4000° F.

While I have described only one embodiment of my invention, it will be understood that the broad idea is susceptible of various modifications without departing from the scope of my invention as defined by the following claims.

I claim:

1. An electro-negative element for a thermoelectric couple comprising columbium and zirconium is approximately the weight proportion of 99% Cb–1% Zr.

2. A thermoelectric couple comprising two electrically connected elements, one element of which consists of molybdenum and the other columbium and zirconium in approximately the weight proportion of 99% Cb–1% Zr.

3. A thermoelectric couple comprising two electrically connected elements, one element of which consists of molybdenum to which a small percentage of titanium has been added to enhance welding, and the other columbium and zirconium in approximately the weight proportion of 99% Cb–1% Zr.

4. A thermoelectric couple comprising two electrically connected elements, one element of which consists of molybdenum and titanium in approximately the weight proportion of 99.5% Mo–0.5% Ti and the other of columbium and zirconium in approximately the weight proportion of 99% Cb–1% Zr.

5. A thermoelectric couple for use in the presence of reactor gamma and neutron flux comprising two electrically connected elements in which one element of the couple consists principally of molybdenum and the other columbium and zirconium in the weight proportion of 99% Cb–1% Zr and in which the insulation between the elements is $Al_2O_3$.

6. A thermoelectric couple for use in the presence of reactor gamma and neutron flux comprising two electrically connected elements in which one element of the couple consists principally of molybdenum and the other columbium and zirconium in approximately the weight proportion of 99% Cb–1% Zr and in which the insulation between the elements is BeO.

References Cited in the file of this patent

UNITED STATES PATENTS 2,137,057 Mason _____ Nov. 15, 1938
2,734,344 Lindenblad _____ Feb. 14, 1956

OTHER REFERENCES

Hansen et al.: Trans. AIME, vol. 195, 1951, pages 884–886.

Atkins et al.: Trans. AIME, vol. 203, 1955, page 1036.